(12) United States Patent
Thrush et al.

(10) Patent No.: US 12,625,076 B2
(45) Date of Patent: May 12, 2026

(54) FLUORESCENCE DETECTION SYSTEM

(71) Applicant: Bio-Rad Laboratories, Inc., Hercules, CA (US)

(72) Inventors: Evan Thrush, San Anselmo, CA (US); Stephen L. Swihart, Walnut Creek, CA (US); Eli A. Hefner, Fairfield, CA (US); Michael Griffin, El Cerrito, CA (US); Li Lu, Livermore, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 805 days.

(21) Appl. No.: 18/052,544

(22) Filed: Nov. 3, 2022

(65) Prior Publication Data

US 2023/0125059 A1     Apr. 20, 2023

Related U.S. Application Data

(63) Continuation of application No. PCT/US2022/047322, filed on Oct. 20, 2022.

(Continued)

(51) Int. Cl.
*G01N 21/64* (2006.01)
*G01J 3/02* (2006.01)
(Continued)

(52) U.S. Cl.
CPC ..... *G01N 21/6428* (2013.01); *G01N 21/6456* (2013.01); *G01N 21/71* (2013.01);
(Continued)

(58) Field of Classification Search
None
See application file for complete search history.

(56) References Cited

U.S. PATENT DOCUMENTS 5,671,047  A     9/1997  Curbelo
6,398,395  B1    6/2002  Hyun
(Continued)

FOREIGN PATENT DOCUMENTS

WO     2020175937 A1    3/2020

OTHER PUBLICATIONS

Thomas, Shane, Authorized Officer, ISA/US, Commissioner for Patents, "International Search Report" in connection with related International Application No. PCT/US2022/047322, dated Feb. 21, 2023, 3 pgs.

(Continued)

*Primary Examiner* — Neil N Turk
(74) *Attorney, Agent, or Firm* — Kolisch Hartwell, P.C.

(57) ABSTRACT

A fluorescence detection system, including apparatus and methods, suitable for qPCR and other fluorescence-based analyses. The system may comprise various components, including a stage, an illumination module, a detection module, and an optical relay structure. The stage may be configured to support a sample holder. The illumination module may include one or more discrete light sources configured to produce excitation light. The detection module may be configured to detect fluorescence emission light produced, in response to the excitation light, by a fluorescent sample positioned in the sample holder. The optical relay structure may include a beamsplitter assembly configured to direct the excitation light from the illumination module along an illumination path to the sample holder and to direct the fluorescence emission light from the sample holder along a response path to the imaging module. The system may enhance the quality of excitation light hitting samples in the sample holder.

16 Claims, 5 Drawing Sheets

Related U.S. Application Data

(60) Provisional application No. 63/257,973, filed on Oct. 20, 2021.

(51) Int. Cl.
   *G01J 3/10* (2006.01)
   *G01N 21/71* (2006.01)

(52) U.S. Cl.
   CPC ............... *G01N 2021/6471* (2013.01); *G01N 2021/6478* (2013.01); *G01N 2201/0415* (2013.01); *G01N 2201/062* (2013.01); *G01N 2201/0638* (2013.01)

(56)           References Cited

U.S. PATENT DOCUMENTS

| | | | | |
|---|---|---|---|---|
| 7,507,575 | B2 * | 3/2009 | Bedingham | G01N 21/645 |
| | | | | 435/283.1 |
| 8,137,616 | B2 * | 3/2012 | Sagner | C12Q 1/6851 |
| | | | | 422/50 |
| 2002/0049386 | A1 * | 4/2002 | Yang | A61B 5/0059 |
| | | | | 356/326 |
| 2006/0006067 | A1 * | 1/2006 | Unger | G01N 21/8483 |
| | | | | 204/603 |
| 2006/0202133 | A1 | 9/2006 | Ok et al. | |
| 2009/0068747 | A1 * | 3/2009 | Iten | G01J 3/0218 |
| | | | | 435/287.2 |
| 2010/0227386 | A1 | 9/2010 | Neuzil et al. | |
| 2012/0085928 | A1 | 4/2012 | Jung et al. | |
| 2015/0293024 | A1 | 10/2015 | King et al. | |
| 2016/0230210 | A1 | 8/2016 | Chen et al. | |
| 2017/0307529 | A1 | 10/2017 | Maher et al. | |
| 2018/0074305 | A1 | 3/2018 | Atzler et al. | |
| 2018/0223335 | A1 * | 8/2018 | Kreifels | C12Q 1/686 |

OTHER PUBLICATIONS

Thomas, Shane, Authorized Officer, ISA/US, Commissioner for Patents, "Written Opinion of the International Searching Authority" in connection with related International Application No. PCT/US2022/047322, dated Feb. 21, 2023, 11 pgs.

Riblet, Philippe, Examiner, European Patent Office, "Extended European Search Report" in connection with related European Patent Application No. 22884496.5, dated Jul. 7, 2025, 10 pgs.

* cited by examiner

FLUORESCENCE DETECTION SYSTEM

CROSS-REFERENCE TO PRIORITY APPLICATION

This application is a continuation of PCT Patent Application Serial No. PCT/US2022/047322, filed Oct. 20, 2022, which in turn is based upon and claims the benefit under 35 U.S.C. § 119(e) of U.S. Provisional Patent Application Ser. No. 63/257,973, filed Oct. 20, 2021. Each of these applications is incorporated herein by reference in its entirety for all purposes.

INTRODUCTION

Fluorescence is an optical phenomenon involving the absorption and reemission of light. It has become the basis of many analytical and diagnostic techniques in biology and medicine due to its sensitivity, selectivity, and versatility. These techniques include polymerase chain reaction (PCR), including real-time or quantitative PCR (qPCR), among others. In a fluorescence-based PCR assay, such as qPCR, one or more fluorescent compounds, termed "fluorophores," are used to assess the status of a PCR reaction. The PCR reaction, in turn, may be used to determine gene expression and the presence or absence of a pathogen or pathogenic state, among many other uses. PCR is used to amplify nucleic acids. Fluorescence is used in PCR to detect the amplified nucleic acids, typically by nonspecific binding to any amplified product or specific binding to a particular amplified product. The binding, which is indicative of the reaction, is associated with a measurable change in fluorescence. Fluorescence-based PCR assays may be conducted on a single sample or many samples by shining "excitation" light on those samples and observing the resulting fluorescence "emission" light. It is important in these fluorescence-based analyses to have quality illumination, free from spatial inhomogeneities and shadows. Otherwise, variations in fluorescence may reflect variations in illumination rather than variations in the samples. Unfortunately, current systems frequently use off-axis illumination than can lead to gradients in excitation light and shadows when samples are contained in wells. Thus, there is a need for improved fluorescence detection systems for use in PCR and other fluorescence-based techniques.

SUMMARY

The present disclosure provides a fluorescence detection system, including apparatus and methods, suitable for qPCR and other fluorescence-based analyses. The system may comprise various components, including a stage, an illumination module, a detection module, and an optical relay structure. The stage may be configured to support a sample holder. The illumination module may include one or more discrete light sources configured to produce excitation light. The detection module may be configured to detect fluorescence emission light produced, in response to the excitation light, by a fluorescent sample positioned in the sample holder. The optical relay structure may include a beamsplitter assembly configured to direct the excitation light from the illumination module along an illumination path to the sample holder and to direct the fluorescence emission light from the sample holder along a response path to the imaging module. The system may enhance the quality of excitation light hitting samples in the sample holder, for example, by collimating and/or homogenizing the light.

DETAILED DESCRIPTION

The present disclosure provides a fluorescence detection system, including apparatus and methods, suitable for qPCR and other fluorescence-based analyses. The system may comprise various components, including a stage, an illumination module, a detection module, and an optical relay structure. The stage may be configured to support a sample holder, such as a PCR plate or microplate. The illumination module may include one or more discrete light sources, such as LEDs or lasers, with at least some of the light sources configured to produce spectrally distinct excitation light. The detection module may be configured to detect fluorescence emission light produced, in response to the excitation light from at least one of the light sources, by a fluorescent sample positioned in the sample holder. Finally, the optical relay structure may include a beamsplitter assembly configured to direct the excitation light from the illumination module along an illumination path to the sample holder and to direct the fluorescence emission light from the sample holder along a response path to the detection module. The system may enhance the quality of excitation light hitting samples in the sample holder, for example, by collimating and/or homogenizing the light. Further aspects of the present disclosure are described below.

I. Fluorescence Detection Systems

Figure 1:
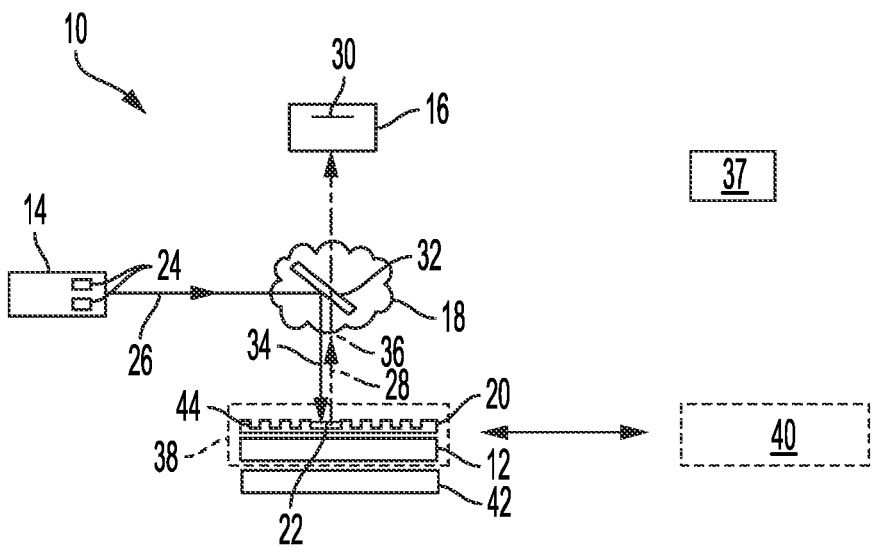
FIG. 1 is a high-level schematic view of an exemplary fluorescence detection system, showing (A) a stage supporting a sample holder that, in turn, supports a fluorescent sample, (B) an illumination module including at least one light source configured to produce excitation light, (C) a detection module configured to detect fluorescence emission light produced by the sample in response to the excitation light, and (D) an optical relay structure including a beamsplitter assembly configured to direct the excitation light from the illumination module along an illumination path to the sample and to direct the fluorescence emission light from the sample along a response path to the detection module.

FIG. 1 is a high-level schematic view of an exemplary fluorescence detection system 10, in accordance with aspects of the present disclosure. The system may include a stage 12, an illumination module 14, a detection module 16, and an optical relay structure 18. The stage may be configured to support a sample holder 20, such as a PCR plate or microplate, that, in turn, supports one or more fluorescent samples 22. The illumination module may include at least one light source 24, and typically a plurality of light sources 24, configured to produce excitation light 26 capable of exciting fluorescence emission light ("fluorescence") 28 from the sample(s) in the sample holder. The detection module may be configured to detect the fluorescence emission light produced by the sample(s) in response to the excitation light and to form an image 30, such as a two-dimensional image of fluorescence intensities, which typically will be represented electronically. The optical relay structure may include a beamsplitter assembly 32 configured to direct the excitation light from the illumination module along an illumination path 34 to the sample and to direct the fluorescence emission light from the sample along a response path 36 to the detection module. Portions of the illumination and response paths may overlap, for example, between the beamsplitter assembly and the sample holder. The system further may include a controller 37 configured to manage at least one of the stage, the illumination module, the detection module, and the optical relay structure.

The stage generally comprises any structure configured to support the sample holder for fluorescence detection. The stage may be further configured to move the sample holder into and out of an examination region 38 for such detection. For example, a user may place and retrieve sample holders from an input/output region 40, and the stage may move (↔) the sample holders between the input/output region and the examination region. Alternatively, or in addition, the stage may include a heating block 42 or other structure(s) configured to control or cycle the temperature of the sample, for example, for PCR or enzyme analysis.

The sample holder generally comprises any substrate or other mechanism for holding samples for fluorescence detection. The sample holder may hold one or more discrete samples at one or more distinct sample sites 44. In some cases, sample sites may be defined by mechanical barriers, such as walls, for example, forming sample wells. In other cases, sample sites may be defined by chemical barriers, such as hydrophobic regions separating hydrophilic regions, or distinct spatially separated binding sites for nucleic acids, proteins, and/or other materials. The sample sites may be separate fluid volumes or share a common fluid volume. Exemplary sample holders with separate volumes may include PCR plates and microplates, among others. Such plates may have any suitable number of sample wells, such as 96, 384, or 1536 sample wells, among others. Exemplary sample holders with a common fluid volume may include sample chips for nucleic acids and/or proteins, among others. The samples themselves may be independent of one another or aliquots or replicates of one another, depending on the analysis. They also may be control or calibration samples.

The illumination module generally comprises any structure configured to produce excitation light capable of inducing fluorescence from a suitable sample. The illumination module may include one or more light sources. These light sources may have the same or different spectral properties. Typically, different light sources will have different spectral properties, with each capable of exciting fluorescence at a different wavelength or range(s) of wavelengths. However, in some cases, two or more similar or identical light sources may be combined to produce higher-intensity excitation light. Exemplary light sources may include light-emitting diodes (LEDs), lasers, solid-state lasers, laser diodes, and superluminescent diodes (SLDs), among others. The light sources may be operated serially, for example, to excite different fluorophores at different times, or simultaneously, for example, for multi-color or multiplexed detection.

The detection module generally comprises any structure configured to detect fluorescence emission light emitted in response to excitation light produced by the illumination module and produce a corresponding signal or other representation for further analysis. The detection module may form an image of samples disposed in the sample holder, or a portion of the sample holder, such that fluorescence emitted from different samples at different positions on the sample can be observed simultaneously. This image may be a minified image. The detection module may comprise a camera, such as a complementary metal-oxide semiconductor (CMOS) camera, a scientific-CMOS (sCMOS) camera, or a charge-coupled device (CCD) camera, among others.

The optical relay structure generally comprises any structure configured to direct excitation light from the illumination module to the sample holder and associated samples and emission light from the sample holder and samples to the detection module. The optical relay structure may include a beamsplitter configured to separate and direct excitation and emission light. The beamsplitter may act similarly on all wavelengths, transmitting or reflecting a similar amount of excitation light and emission light at least substantially independent of the wavelength of the light. Examples include partially silvered, including half-silvered (50:50), beamsplitters. Alternatively, the beamsplitter may act differently on different wavelengths, for example, preferentially reflecting excitation light and transmitting emission light, or vice versa. Examples include dichroic beamsplitters and multi-dichroic beamsplitters. The beamsplitter may have any suitable shape, including a cube or a plate or slab. The beamsplitter may be non-polarizing or polarizing, depending on the type of use or assay. In the pictured embodiment, the beamsplitter reflects the excitation light toward the sample holder and transmits the fluorescence emission light toward the detector. However, in other embodiments, the beamsplitter may transmit the excitation light toward the sample holder and reflect the fluorescence emission light toward the detection module. Excitation light and emission light are portrayed in the figures using lines that denote a centerline of the respective paths taken by the light. In actuality, both the excitation light and emission light will generally fill a volume that may be clipped by windows or other apertures, shaped by lenses, and so on. Thus, the excitation light may fan out enough to illuminate most or all of the sample holder and the associated sample sites and samples. Fluorescence emission light is generally emitted isotropically (except, for example, in some polarization assays). This description focuses on the subset of emission light that is ultimately detectable by the detection module.

The optical relay structure further may include excitation and/or emission filters. Excitation filters may be used to alter the spectral properties of the excitation light, before it impinges on samples in the sample holder, generally by reducing or blocking light at selected wavelengths and/or ranges of wavelengths. Excitation filters typically are not used with monochromatic or narrow-wavelength sources, such as lasers and LEDs. Emission filters may be used to alter the spectral properties of the light incident on the detection module. This light is typically a combination of fluorescence emission light from samples and stray excitation light that unintentionally ends up in the response path. The emission filters may preferentially block excitation light, so the image generated by the detection module better represents only fluorescence emission light. This is possible, for single-photon excitation, because the excitation light generally has shorter wavelengths (higher frequencies) than the fluorescence emission light it induces. The emission filters also may block fluorescence emission light outside certain fluorescence wavelengths, for example, to reduce signal contributions from autofluorescence and/or other fluorophores involved in the analysis that are inadvertently excited by the excitation light. The excitation and emission filters typically are chosen to work with specific light sources, beamsplitters (if dichroic or multi-dichroic beamsplitters are used), and fluorophores. In some cases, the filters may work with more than one light source and/or more than one fluorophore. For example, the filters may pass light in certain sets of wavebands and block light in other sets of wavebands (e.g., pass blue, block green, pass yellow, block red, or vice versa, among other combinations).

The optical relay structure further may include neutral density filters to alter the intensity of the excitation and/or emission light before the light is incident on the sample(s) or detection module, respectively. Such filters may be placed in the illumination path, upstream from the beamsplitter, to alter the intensity of excitation light and in the response path, downstream from the beamsplitter, to alter the intensity of fluorescence emission light. Alternatively, or in addition, the intensity of the excitation light (and indirectly the emission light) can be controlled by the illumination module itself, for example, by altering the strength and/or duration of power supplied to the light sources.

The optical relay structure further may include one or more lenses positioned in the illumination path and/or the response path. These lenses may perform any suitable function. For example, a lens positioned in the illumination path may homogenize and collimate excitation light incident on the sample holder, such that its intensity is more uniform and/or it is more nearly parallel to the optical axis and/or perpendicular to a plane of the sample holder, reducing shadows. Alternatively, or in addition, a lens positioned in the response path may collect fluorescence emission light and direct it toward the detection module, increasing the amount of light captured by the detection module. The lens also may focus light onto the detection module to assist in image formation. Lenses in the optical relay structure may complement or supplement the role of lenses integral with the illumination module and/or detection module. The lenses may variously and without limitation be termed condenser lenses, field lenses, and tube lenses, among others, depending on their positions and functions.

The relative positions and sizes of optical components, including light sources, beamsplitters, and lenses, may be adjusted to increase or decrease the portion of the sample holder that is illuminated and/or to alter the quality of that illumination.

Figure 2:
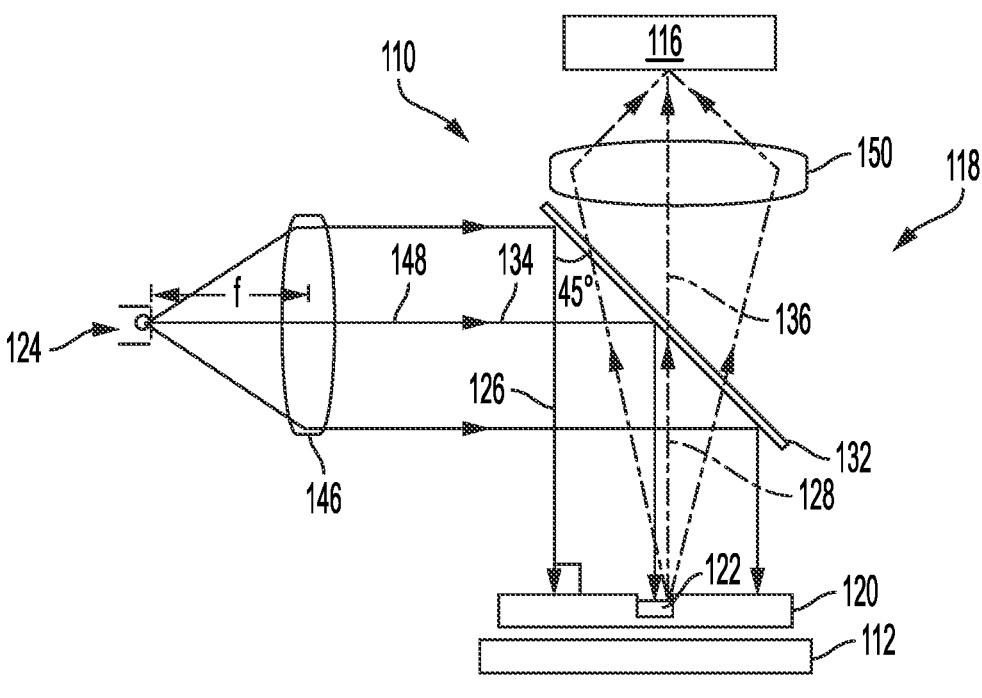
FIG. 2 is a schematic view of a first embodiment of the fluorescence detection system of FIG. 1, showing details of a first exemplary optical relay structure, including a condenser lens positioned in the illumination path one focal length from the light source and upstream from the beamsplitter, such that excitation light produced by the light source uniformly illuminates the sample, and a field lens positioned in the response path downstream from the beamsplitter to collect and focus fluorescence emission light onto the detection module.

FIG. 2 is a schematic view of a first embodiment 110 of the fluorescence detection system of FIG. 1. In this embodiment, the optical relay structure 118 includes a condenser lens 146, characterized by a focal length f, positioned in the illumination path 134 between the light source 124 and beamsplitter 132. In other words, the condenser lens is positioned downstream from the light source and upstream from the beamsplitter. The lens optionally may be positioned one focal length from the light source. In this case, excitation light 126 downstream from the lens will be collimated and uniform. Moreover, if the light source is also positioned along an optical axis 148 of the lens, or sufficiently close to the optical axis, and the beamsplitter is oriented at or about 45 degrees relative to the optical axis and the sample holder 120, the excitation light will hit the sample holder, when supported by the stage 112, parallel to the optical axis and perpendicular to a plane of the sample holder. This may reduce the likelihood of shadows in the illumination. From a quantitative viewpoint, "sufficiently close to the optical axis," as used above, may mean within about 1 degree, 2 degrees, 3 degrees, or 5 degrees, among others, of the optical axis. From a practical viewpoint, "sufficiently close" may mean close enough to illuminate enough of the bottom of the well plate, in well-based assays, as not to impact the assay performance. An optional field lens 150 may be positioned in the response path 136 downstream from the beamsplitter to collect fluorescence emission light 128 and focus it onto the detection module 116. The system of FIG. 2 can be used to generate and detect fluorescence by powering on the light source, causing excitation light to hit sample(s) 122 in the sample holder, and then detecting the resulting fluorescence with the detection module.

Figure 3:
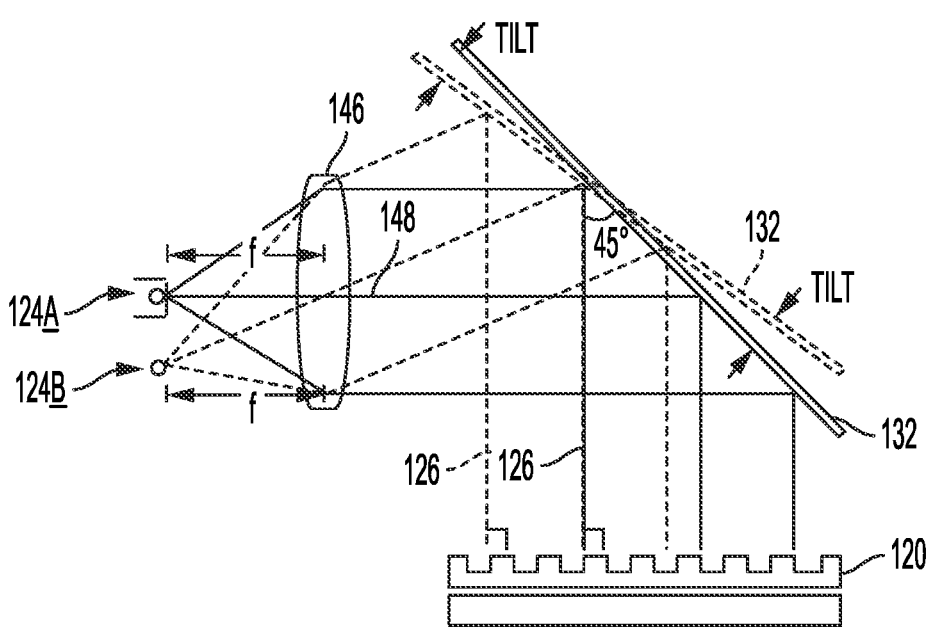
FIG. 3 is a schematic view of portions of the embodiment of FIG. 2, showing how a tiltable beamsplitter allows both on- and off-axis light sources to deliver uniform illumination to the sample.

FIG. 3 is a schematic view of illumination-related portions of the embodiment of FIG. 2. Here, a tiltable (i.e., reorientable) beamsplitter 132 allows both on-axis light sources 124A and off-axis light sources 124B to deliver perpendicular excitation light 126 to the sample holder 120. Here, on-axis and off-axis mean on the optical axis 148 of the condenser lens 146, and off the optical axis of the condenser lens, respectively. The light sources are again positioned one focal length f from the lens, such that light downstream from the lens will be collimated and uniform. Excitation light exits the lens parallel to the optical axis when the light source is located on the optical axis. However, excitation light exits the lens at a nonzero angle relative to the optical axis when the light source is located off the optical axis. In this case, light from the on- and off-axis light sources would hit the sample holder at different angles if redirected by a stationary beamsplitter. However, light from both light sources can be made to hit the sample holder at the same (e.g., perpendicular) angle if the beamsplitter is tiltable by changing an angle of the beamsplitter with respect to the optical axis depending on which light source is being used for illumination. In the pictured embodiment, the beamsplitter may be positioned at 45 degrees for a light source positioned on the optical axis (like in FIG. 2), the beam-splitter may be positioned at a shallower (more horizontal) angle with respect to the optical axis for a light source located below the optical axis, and the beamsplitter may be positioned at a steeper (more vertical) angle for a light source positioned above the optical axis. Suitable angles can be found for a variety of light source and sample holder positions. In other embodiments, the beamsplitter may be fixed and either the light sources all located close enough to the optical axis that suitably perpendicular illumination of the sample holder is achieved or the light sources may be moved into the optical axis depending on which light source is in use. Significantly, the angle of the beamsplitter typically will not alter the path of fluorescence emission light traveling through the beamsplitter toward the detection module, except to offset it slightly by an amount dependent on the thickness of the beamsplitter, among other factors. The system of FIG. 3 may be used like the system of FIG. 2, with the added ability to tilt the beamsplitter to adjust a tilt angle of the beamsplitter to alter the angle at which excitation light hits the sample(s).

Figure 4:
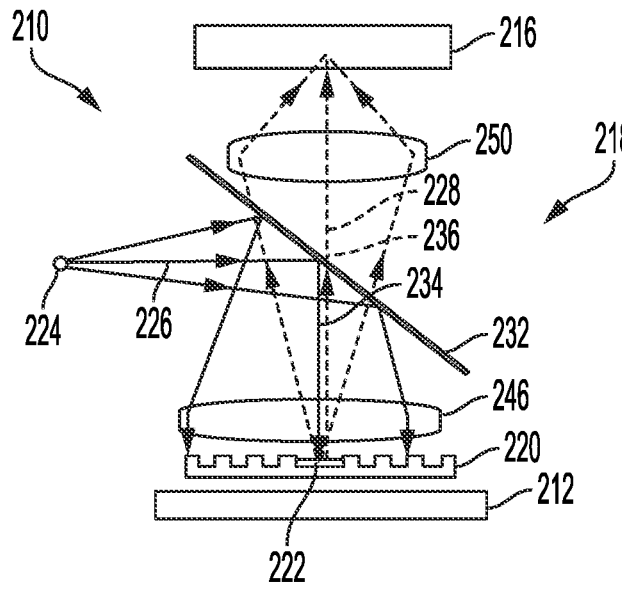
FIG. 4 is a schematic view of a second embodiment of the fluorescence detection system of FIG. 1, showing details of a second exemplary optical relay structure, including a condenser lens positioned in the illumination path one focal length from the light source and downstream from the beamsplitter, such that excitation light produced by the light source uniformly illuminates the sample, and a field lens positioned in the response path downstream from the beamsplitter to collect and focus fluorescence emission light onto the detection module.

FIG. 4 is a schematic view of a second embodiment 210 of the fluorescence detection system of FIG. 1. In this embodiment, the optical relay structure 218 again includes a condenser lens 246 positioned in the illumination path 234, like in FIGS. 2 and 3, but this time the lens is positioned downstream, rather than upstream, from the beamsplitter 232. In other words, excitation light 226 from the light source 224 first encounters the beamsplitter and then encounters the condenser lens. If the light source is again positioned one focal length f from the lens (along the folded optical path from the light source to the lens), light exiting the lens will be collimated and uniform. Fluorescence emission light 228 produced by sample(s) 222 positioned in the sample holder 220, which in turn is supported by the stage 212, will pass back through the condenser lens on its way to the detection module 216. The condenser lens will collect this light and bend it toward the response path 236. However, the lens will not be strong enough to focus the light unless it is more than one focal length from the sample. Instead, a field lens 250 in the response path downstream from the beamsplitter (i.e., between the beamsplitter and detection module) may be used to finish collecting diverging emission light and focus it onto the detection module. The system of FIG. 4 can be used like the systems of FIGS. 2 and 3 (in the latter case, if the beamsplitter is tiltable).

Figure 5:
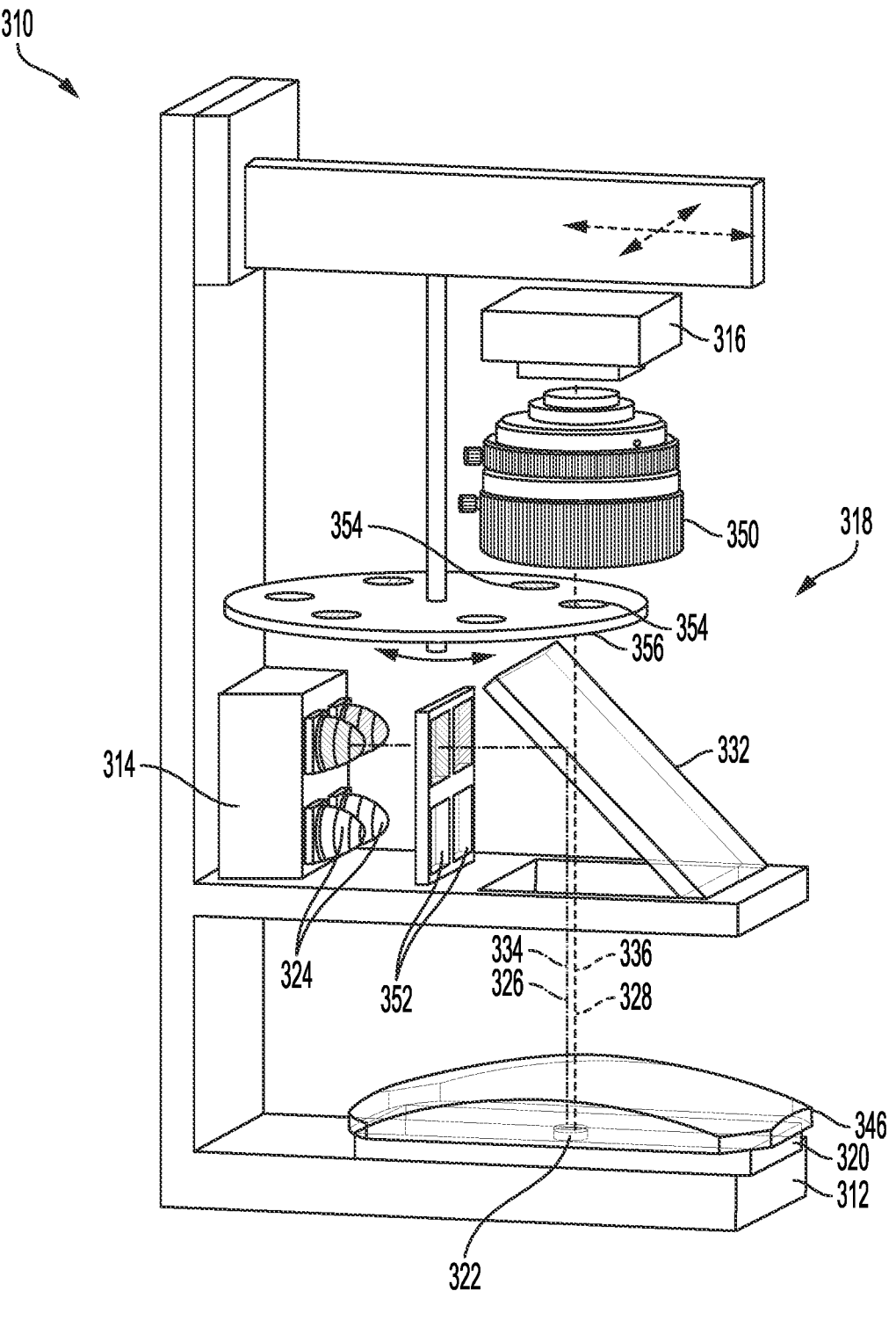
FIG. 5 is an isometric view of a third embodiment of the fluorescence detection system of FIG. 1, showing an illumination module having an array of light sources and an optical relay structure having a single beamsplitter that directs light from each light source along an illumination path toward the sample.

FIG. 5 is an isometric view of a third embodiment 310 of the fluorescence detection system of FIG. 1. In this embodiment, excitation light 326 from an illumination module 314 is again directed onto samples 322 in a sample holder 320 supported by a stage 312, and fluorescence emission light 328 from the samples is again directed to a detection module 316. The illumination module now includes a planar arrangement of light sources 324, such as LEDs and/or lasers, and the detection module now includes an image sensor, such as a CMOS camera. The intervening optical relay structure 318 includes a single beamsplitter 332, which directs light produced by each light source along an illumination path 334 toward the sample holder, and which transmits fluorescence emission light produced by the sample along a response path 336 to the detection module. The optical relay structure further includes a variety of excitation and emission filters and lenses.

Excitation light produced by a given light source in the array is first incident upon a corresponding excitation filter 352. Here, the excitation filters are organized in a planar array such that light from a given light source passes through a corresponding filter (e.g., a green-pass filter for a light source being used to produce green excitation light, a red-pass filter for a light source being used to produce red excitation light, etc.). Light sources and corresponding filters may be arranged in any suitable manner, typically (as shown in the FIG. 5) but not necessarily equidistant from and close to the optical axis.

The filtered excitation light is next reflected off a beamsplitter toward the sample holder. The beamsplitter may be a partially silvered beamsplitter, reflecting a portion of the excitation light from each light source toward the sample holder and transmitting a portion of the fluorescence emission light from sample(s) in the sample holder toward the detection module. Alternatively, the beamsplitter may be a multi-dichroic beamsplitter with a transmission profile selected such that light from each light source is reflected by the beamsplitter toward the sample holder and fluorescence emission light produced in response to excitation light from each light source is transmitted through the beamsplitter toward the detection module. The beamsplitter may be tiltable, if desired, to allow adjustment of the angle at which light from different off-axis light sources strikes the sample holder. Alternatively, or in addition, the light sources may be movable.

Emission light produced by sample(s), after passing back through the beamsplitter, then passes through a corresponding emission filter 354 to reject stray excitation light (and to perform any other desired cleanup). The emission filter may be specific to a light source and fluorophore or work with sets of light sources and fluorophores, as described above. In the former case, any suitable mechanism may be used to alternate which filter is in the response path. In the pictured embodiment, the emission filters are disposed in a circular array, on a motorized wheel 356, such that an appropriate emission filter may be dialed into the response path simply by turning the wheel. Here, the wheel rotates in a plane perpendicular to portions of both the illumination path and the response path where the two paths are collinear.

The optical relay structure in FIG. 5 further includes two lenses. A first lens 346, such as a plano-convex lens, is positioned in the illumination path downstream from the beamsplitter (i.e., between the beamsplitter and the sample holder). This lens, which may alternatively be termed a condenser or objective lens, among others, may help to collimate and homogenize excitation light before it impinges on the sample. This lens also helps to collect fluorescence emission light and direct it back toward the beamsplitter. A second lens 350 is positioned in the response path downstream from the beamsplitter (i.e., between the beamsplitter and the detection module). It alternatively may be positioned between the beamsplitter and the emission filter or between the emission filter and the detection module. The second lens, which may be termed a field lens, among others, captures emission light and helps to focus it onto the detection module. The first and second lenses, separately and in conjunction, act to increase the amount of emission light captured by the detection module, increasing its sensitivity. This, in turn, can reduce image acquisition times.

The first and second lenses, like other lenses in the present disclosure, may have any suitable properties. They are generally converging lenses. The first lens may be a plano-convex converging lens. Its size may correspond to a size of the sample holder, or a portion of the sample holder that can be simultaneously imaged by the detection module, especially if its purpose is to collimate excitation light exiting the lens toward the sample holder. The lenses may be simple lenses, compound lenses, or groups of lenses capable of performing the indicated functions. In some cases, compound lenses and/or groups of lenses may better reduce aberrations, such as spherical and/or chromatic aberrations, among others.

The system of FIG. 5 can be used like the systems of FIGS. 2-4. However, the presence of multiple light sources, together with associated filters, allows more complicated samples to be analyzed. For example, individual samples may contain two or more fluorophores, each excited to emit fluorescence by a different light source, and different samples may contain different fluorophores or sets of fluorophores. In these cases, fluorescence from a first fluorophore can be generated and detected by powering on a corresponding first light source, capable of exciting the first fluorophore, collecting a first fluorescence signal using the detection module after fluorescence from the first fluorophore has passed through an appropriate first emission filter, and then powering off the first light source. Fluorescence from a second fluorophore can be detected similarly by powering on a second light source, capable of exciting fluorescence from the second fluorophore, collecting a second fluorescence signal using the detection module after fluorescence from the second fluorophore has passed through an appropriate second emission filter, and then powering off the second light source. This process can be repeated for each desired fluorophore. Emission filters may be changed by rotating or otherwise moving the first emission filter out of the response path and the second emission filter into the response path. A tilt angle of the beamsplitter and/or a position of respective light sources may be altered between fluorophores, if desired. The entire process can be repeated for samples in different portions of the sample holder, if less than the entire sample holder is analyzed at a time, by moving the stage and/or sample holder to bring a new region into the examination region, and for samples in different sample holders by changing sample holders (or by changing samples in a given sample holder). In some cases, two or more light sources may be used simultaneously, either because both excite fluorescence from the same fluorophore, or because the detection module is capable of multiplexed (e.g., two or more color) detection.

Figure 6:
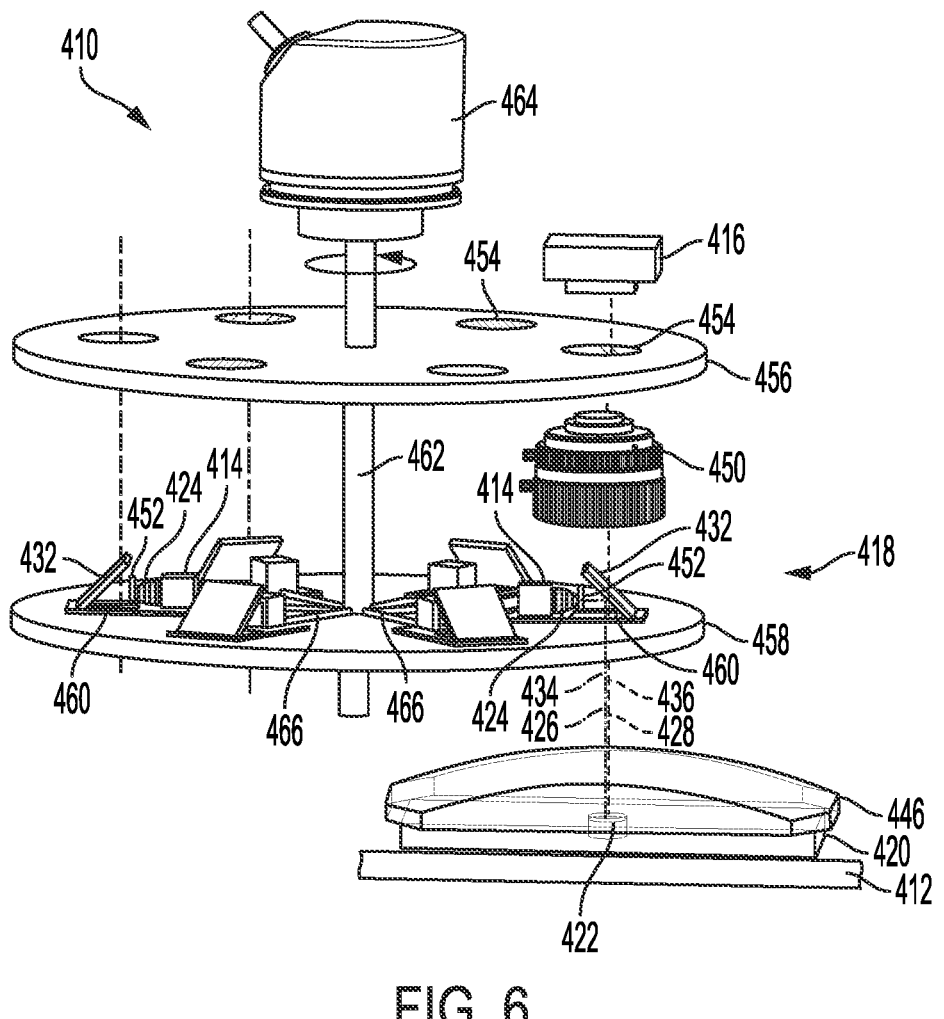
FIG. 6 is a perspective view of a fourth embodiment of the fluorescence detection system of FIG. 1, showing an illumination module having a plurality of light sources and an optical relay structure having a corresponding plurality of beamsplitters, where each light source is optically coupled with a unique one of the beamsplitters, where each pair of an optically coupled light source and beamsplitter is mounted on a first wheel such that given pairs can alternately be positioned to illuminate the sample by rotating the first wheel, and where optional emission filters are mounted on a second wheel that can be rotated in tandem with the first wheel.

FIG. 6 is a perspective view of a fourth embodiment 410 of the fluorescence detection system of FIG. 1. In this embodiment, the illumination module 414 again includes a plurality of light sources 424, like the embodiment of FIG. 5. However, instead of a single beamsplitter, the optical relay structure 418 includes a plurality of beamsplitters 432. Some of the light sources may be optically coupled with one beamsplitter, and others of the light sources may be optically coupled with another beamsplitter. In the pictured embodiment, the number of beamsplitters corresponds to the number of light sources, with each light source optically coupled with a unique one of the beamsplitters. In use, given pairs of a light source and a beamsplitter are alternately positioned to illuminate sample(s) 422 in the sample holder 420. This may be accomplished by mounting respective sets of light sources and beamsplitters together on a shared support member, which can be rotated, translated, and/or otherwise moved to effect the change. Light sources and beamsplitters in the pictured embodiment are mounted on an excitation wheel 458. Excitation light 426 from a given light source is directed at a corresponding beamsplitter, which in turn reflects the light through a corresponding window 460 in the support member toward the sample holder. The beamsplitter may be a partially silvered beamsplitter or a dichroic beamsplitter, as desired, with the dichroic beamsplitter being more efficient but also more expensive.

The system further may include excitation filters 452 and/or emission filters 454, as described above. Excitation filters, if desired, may be positioned in the illumination path 434, typically between a given light source and its respective beamsplitter, and disposed such that emission light 428 traveling back through the window misses it. Emission filters, if desired, may be positioned in the response path 436, typically between the beamsplitter and the detection module 416. There may be a one-to-one correspondence between emission filters and light sources, with the spectral properties of the emission filter chosen to block stray excitation light from the associated light source (to reduce the amount of excitation light that reaches the detection module). Emission filters may be mounted together on their own shared emission support member. For example, the emission filters in the pictured embodiment are mounted together on an emission wheel 456. The emission wheel may be coaxial with the excitation wheel and may be moved independently or in tandem with the excitation wheel, so that matched sets of a light source, a beamsplitter, and an emission filter are aligned along the optical axis and can be rotated into position together. Tandem movement of the excitation and emission wheels may be facilitated when both are coaxial by mounting both to a common axle or shaft 462 and driving both with a common driver, such as a stepper motor 464. Here, the excitation wheel and the emission wheel both rotate in planes that are parallel to one another and perpendicular to pertinent portions of the optical axis and portions of both the illumination path and the response path where the two paths are collinear. In contrast, in the pictured embodiment, the shaft is perpendicular to the wheels and parallel to both pertinent portions of the optical axis and portions of both the illumination and response paths where they are collinear. The shaft further may provide an electrical connection to the light sources, for example, by running power through the shaft to wires 466 on the excitation wheel connected to the light sources.

The system further may include one or more lenses, like the embodiment of FIG. 5. Here, a first (e.g., condenser) lens 446 is positioned adjacent the sample holder, collimating and homogenizing excitation light before it impinges on the sample holder and gathering and reducing the divergence of the emission light before it impinges on the beamsplitter. The light sources may be positioned at the focal length f of the first lens. A second (e.g., field) lens 450 is positioned between the beamsplitter and detection module, where it collects and focuses emission light before it impinges on the detection module. The second lens can be positioned before or after the emission filter. Positioning the field lens closer to the beamsplitter, before the emission filter, may increase the amount of fluorescence emission light it captures, because the front face of the lens will subtend a greater solid angle relative to the sample holder, increasing the numerical aperture and sensitivity of the system. (This also applies to previous embodiments, like that in FIG. 5.)

In alternative embodiments, light sources, beamsplitters, and/or filters may be mounted on sliders or other movable mounts, instead of wheels, so that matched sets or subsets of each may be slid or otherwise moved rather than rotated into position.

The system of FIG. 6 can be used largely like the systems of FIGS. 2-5. In particular, multiple light sources can again be used to generate and detect fluorescence from multiple fluorophores. Here, a light source, beamsplitter, and emission filter for a given fluorophore can be rotated or otherwise moved into position. During this process, the condenser lens, field lens, and detection module may remain stationary.

For analysis, the sample plate (and associated samples), condenser lens, given beamsplitter, corresponding emission filter, and detection module will be aligned, forming a straight-line path between the sample holder and the detection module. (In alternative embodiments, parts of this path may be folded, for example, by introducing one or more mirrors into the path.) Subsequent fluorophores may be analyzed by rotating a new set of a light source, beamsplitter, and emission filter into the path and then using the new light source to excite fluorescence and the new emission filter to clean up the resulting fluorescence.

Figure 7:
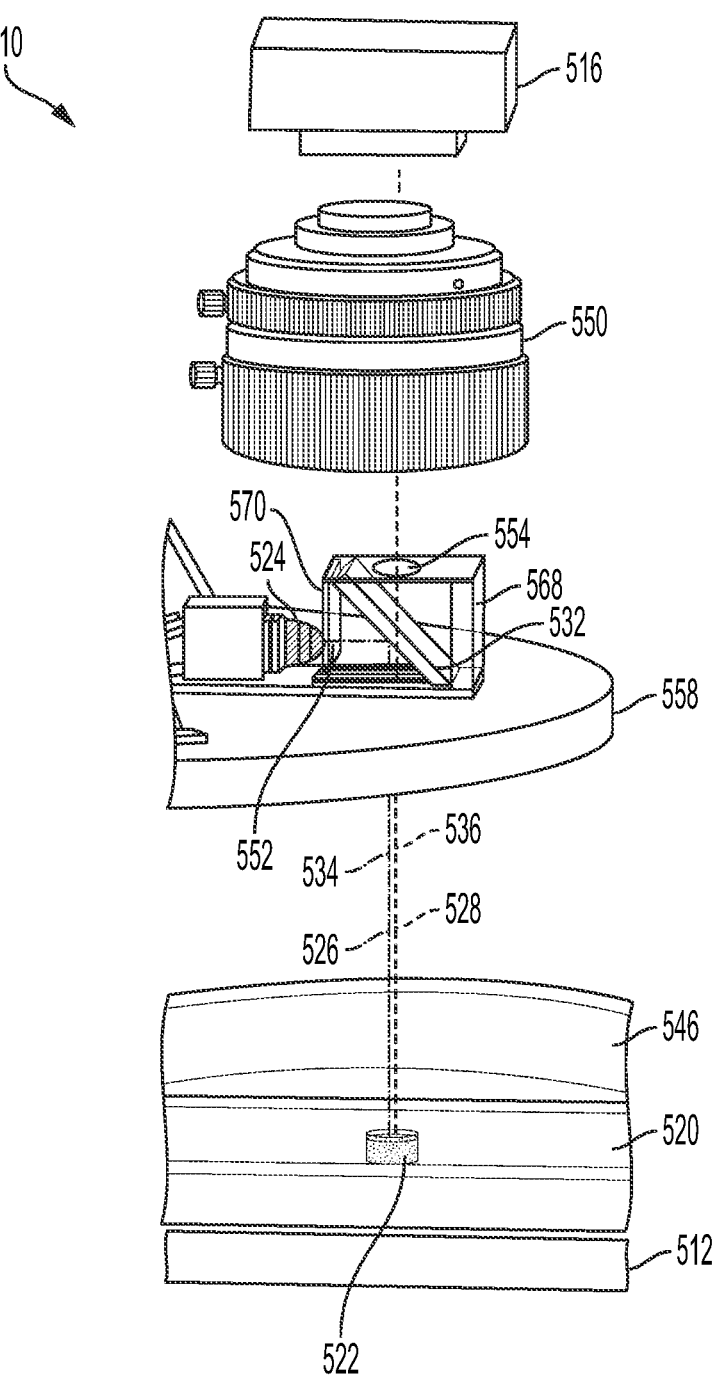
FIG. 7 is a partial perspective view of a variation on the embodiment of FIG. 6, showing emission filters mounted on a support fixed to the wheel containing the light sources and beamsplitters, instead of being mounted on a second wheel.

FIG. 7 is a partial perspective view of a variation 510 on the embodiment of FIG. 6. In this variation, which otherwise resembles the embodiment of FIG. 6, emission filters 554 are mounted on a support 568 fixed to the (excitation) wheel 558 containing the light sources 524 and beamsplitters 532, instead of being mounted on a second (emission) wheel. Optional excitation filters 552 may be mounted on a suitable transverse support 570 between the light source and beamsplitter. The system of FIG. 7 can be used largely like the system of FIG. 6, except that only a single wheel 558 or other support platform needs to be moved to change light source, beamsplitter, and emission filter. In short, excitation light 526 produced by the light source passes through the excitation filter, if present, and is reflected along an illumination path 534 by the beamsplitter 532, which takes the light through a condenser lens 546 onto a sample 522 in a sample holder 520 supported by a stage 512. Emission light 528 produced by the sample in response to the excitation light passes back along a response path 536 through the condenser lens and then through the beamsplitter, the emission filter, and a field lens 550, after which it impinges on the detection module 516.

The fluorescence detection system of the present disclosure may be used for any suitable fluorescence analysis. Suitable analyses may include single-color (single fluorophore) analysis or multi-color (multi-fluorophore) analysis. Single-color analysis may be performed with one light source. Multi-color analysis may be performed with multiple light sources and potentially may involve reorienting the beamsplitter and/or swapping in a new beamsplitter as well as swapping emission filters. Suitable analyses also may include single-time (e.g., endpoint) analysis or multi-time (e.g., real-time or time-course) analysis. Single-time analysis may be performed at a single time, for example, generating and detecting fluorescence at an endpoint of a reaction. Multi-time analysis may be performed at multiple times, for example, before and after changing the sample (e.g., by introducing a candidate modulator) or during or between thermocycles in a polymerase chain reaction (PCR). To facilitate PCR analysis, the stage may include a heating block and other thermocycling equipment, as described in connection with FIG. 1.

Signals formed by the detection module may take any suitable form and be used for any suitable purpose. The signals may take the form of an image or images. These images may be one color (monochromatic) or multi-color. They may represent an intensity of fluorescence from a given position of the sample holder and thus from a given sample associated with that position. The intensity, in turn, may be an indicator for some other variable of interest, such as the presence, absence, or identity of a compound, an absolute or relative quantity or concentration of a compound, the status of a reaction, the effect of a candidate modulator on a reaction, and so on. For example, the intensity may be used to assess the status of a PCR reaction, such as an endpoint PCR reaction or a real-time PCR reaction.

II. Selected Aspects

This section describes selected aspects of the fluorescence detection system of the present disclosure as a series of indexed paragraphs.

1. A fluorescence detection system, comprising:

a stage configured to support a sample holder;

an illumination module including a plurality of discrete light sources, each light source configured to produce spectrally distinct excitation light;

a detection module configured to detect fluorescence emission light produced, in response to the excitation light from at least one of the light sources, by a fluorescent sample positioned in the sample holder; and an optical relay structure including a beamsplitter assembly configured to direct the excitation light from the illumination module along an illumination path to the sample holder and to direct the fluorescence emission light from the sample holder along a response path to the detection module, wherein the illumination path and the response path overlap between the beamsplitter assembly and the sample holder.

2. The system of paragraph 1, the fluorescence detection system being a real-time PCR detection system, wherein the stage further includes a heating block configured to cycle the temperature of the sample such that PCR occurs, altering the fluorescence of the sample.

3. The system of paragraph 1 or 2, wherein the light sources are LEDs.

4. The system of any of paragraphs 1-3, wherein the detection module includes a camera configured to form a minified image of samples disposed in the sample holder.

5. The system of paragraph 4, wherein the camera is a CMOS camera.

6. The system of any of paragraphs 1-5, wherein the optical relay structure further includes a condenser lens positioned in the illumination path such that excitation light exiting the condenser lens and incident on the sample holder is collimated and perpendicular to a plane of the sample holder.

7. The system of paragraph 6, wherein the condenser lens is positioned upstream of the beamsplitter.

8. The system of paragraph 6, wherein the condenser lens is positioned downstream of the beamsplitter.

9. The system of any of paragraphs 1-8, further comprising a controller configured to manage at least one of the stage, the illumination module, the detection module, and the optical relay structure.

Single Beamsplitter Embodiments

10. The system of any of paragraphs 1-9, wherein the beamsplitter assembly includes a single beamsplitter, and wherein excitation light produced by each light source is directed toward the sample holder by the single beamsplitter.

11. The system of paragraph 10, wherein excitation light produced by each light source is initially directed along parallel but offset paths toward the single beamsplitter.

12. The system of paragraph 11, wherein a tilt angle of the beamsplitter relative to the parallel but offset paths can be adjusted so that the excitation light directed by the beamsplitter toward the sample holder from each light source is parallel.

13. The system of any of paragraphs 10-12, wherein the optical relay structure further includes an emission filter positioned in the response path between the beamsplitter and the detection module and configured to reduce the amount of excitation light that reaches the detection module.

14. The system of paragraph 13, wherein there is a distinct emission filter for each light source, and wherein the distinct emission filters can alternately be placed in the response path depending on which light source is being used to produce excitation light.

15. The system of any of paragraphs 10-14, wherein the optical relay structure further includes a field lens positioned in the response path downstream from the beamsplitter and configured to collect fluorescence emission light and direct it toward the detection module.

Multiple Beamsplitter Embodiments

16. The system of any of paragraphs 1-9, wherein the optical relay structure includes a plurality of beamsplitters corresponding in number to the plurality of light sources, wherein each light source is optically coupled with a unique one of the beamsplitters, and wherein given pairs of a light source and a beamsplitter can alternately be positioned to illuminate the sample.

17. The system of paragraph 16, wherein each pair of an optically coupled light source and a beamsplitter is mounted on an excitation wheel such that given pairs can alternately be positioned to illuminate the sample by rotating the wheel.

18. The system of paragraph 16 or 17, wherein the optical relay structure further includes a plurality of emission filters corresponding in number to the number of optically coupled pairs of a light source and a beamsplitter and configured to reduce the amount of excitation light that reaches the detection module.

19. The system of paragraph 18, wherein the emission filters are mounted on an emission wheel that can be rotated in tandem with the excitation wheel.

20. The system of paragraph 19, wherein the excitation wheel and emission wheel are coaxial and their rotation is driven by a common driver.

21. The system of paragraph 18, wherein the emission filters are mounted on the excitation wheel.

22. The system of any of paragraphs 17-21, wherein power for the light sources is derived through wires connecting the light sources to a shaft about which the excitation wheel rotates.

23. The system of any of paragraphs 18-22, wherein the optical relay structure further includes a field lens positioned in the response path downstream from the beamsplitter assembly and configured to collect fluorescence emission light and direct it toward the detector module.

24. The system of paragraph 23, wherein the field lens is positioned upstream from the emission filter.

Methods

25. A method of reading fluorescence, comprising:
    providing the fluorescence detection system of any of paragraphs 1-24;
    providing a sample holder having a plurality of sample sites, each sample site containing a fluorescent sample;
    illuminating the sample holder with excitation light produced by the illumination module; and
    collecting an image of fluorescence from the fluorescent samples using the detection module.

26. The method of paragraph 25, the fluorescence detection system being the system of any of paragraphs 10-15, further comprising:
    illuminating the sample holder with excitation light from a first light source from the plurality of light sources, and collecting a first image of fluorescence; and illuminating the sample holder with excitation light from a second light source from the plurality of light sources, and collecting a second image of fluorescence from the fluorescent samples.

27. The method of paragraph 26, further comprising changing a tilt angle of the beamsplitter between the steps of illuminating the sample holder with excitation light from a first light source and illuminating the sample holder with excitation light from a second light source.

28. The method of paragraph 25, the fluorescence detection system being the system of any of paragraphs 16-24, further comprising:
    positioning a first one of the light sources and a first one of the beamsplitters so that the sample holder is illuminated with light from the first light source, and collecting a first image of fluorescence; and
    positioning a second one of the light sources and a second one of the beamsplitters such that the sample holder is illuminated with light from the second light source, and collecting a second image of fluorescence from the fluorescent samples.

29. The method of any of paragraphs 25-28, the steps of positioning the sample holder and collecting an image being performed at an initial time, further comprising repeating the steps of illuminating and collecting of the same samples at a later time.

30. The method of paragraph 29, further comprising quantifying differences in the fluorescence images collected at the initial and later times.

31. The method of paragraph 29 or 30, wherein the samples are PCR samples, further comprising thermally cycling the samples between the initial time and the later time.

32. A fluorescence plate reader system, comprising:
    a stage configured to support a sample plate having a plurality of sample wells;
    an illumination module having two light sources configured to produce excitation light;
    a detection module configured to detect fluorescence emission light produced in response to the excitation light by a fluorescent sample positioned in at least one of the plurality of sample wells; and
    an optical relay structure configured to direct the excitation light from the illumination module to the sample plate and to transmit the fluorescence emission light from the sample plate to the detection module, wherein the optical relay structure includes two beamsplitters, and wherein each light source is optically coupled with a unique one of the two beamsplitters, such that one light source and one beamsplitter can be positioned to illuminate the sample plate, or alternately the other light source and other beamsplitter can be positioned to illuminate the sample.

33. A fluorescence detection system, comprising:
    a stage configured to support a sample holder;
    an illumination module including a plurality of discrete light sources, each light source configured to produce spectrally distinct excitation light;
    a detection module configured to detect fluorescence emission light produced, in response to the excitation light from at least one of the light sources, by a fluorescent sample positioned in the sample holder; and
    an optical relay structure including a beamsplitter assembly configured to direct the excitation light from the illumination module along an illumination path to the sample holder and to direct the fluorescence emission light from the sample holder along a response path to the detection module, wherein the illumination path and the response path overlap between the beamsplitter assembly and the sample holder;

wherein the optical relay structure includes a plurality of beamsplitters corresponding in number to the plurality of light sources, wherein each light source is optically coupled with a unique one of the beamsplitters, and wherein given pairs of a light source and a beamsplitter can alternately be positioned to illuminate the sample.

34. The fluorescence detection system of paragraph 33, further comprising one or more of the limitations of paragraphs 2-9 and 16-24.

35. A fluorescence detection system, comprising:

a stage configured to support a sample holder;

an illumination module including a plurality of discrete light sources, each light source configured to produce spectrally distinct excitation light;

a detection module configured to detect fluorescence emission light produced, in response to the excitation light from at least one of the light sources, by a fluorescent sample positioned in the sample holder; and an optical relay structure including a beamsplitter assembly configured to direct the excitation light from the illumination module along an illumination path to the sample holder and to direct the fluorescence emission light from the sample holder along a response path to the detection module, wherein the illumination path and the response path overlap between the beamsplitter assembly and the sample holder;

wherein the beamsplitter assembly includes a single beamsplitter, wherein excitation light produced by each light source is initially directed along parallel but offset paths toward the single beamsplitter, and wherein the excitation light produced by each light source is directed toward the sample holder by the single beamsplitter.

36. The fluorescence detection system of paragraph 35, further comprising one or more limitations of the limitations of paragraphs 2-15.

The term "exemplary" as used in the present disclosure, means "illustrative" or "serving as an example." Similarly, the term "exemplify" (or "exemplified") means "to illustrate by giving an example." Neither term implies desirability or superiority. In addition, the term "fluorescence" is intended to cover any form of photoluminescence, in which absorption of one or more photons promotes an electron to an excited state and leads to subsequent emission of a new photon, whether from a single state (fluorescence), a triplet state (phosphorescence), or other state.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure. Further, ordinal indicators, such as first, second, or third, for identified elements are used to distinguish between the elements, and do not indicate a particular position or order of such elements, unless otherwise specifically stated.

What is claimed:

1. A fluorescence detection system, comprising:

a stage configured to support a sample holder;

an illumination module including a plurality of discrete light sources, each light source configured to produce spectrally distinct excitation light;

a detection module configured to detect fluorescence emission light produced, in response to the excitation light from at least one of the light sources, by a fluorescent sample positioned in the sample holder; and an optical relay structure including a beamsplitter assembly configured to direct the excitation light from the illumination module along an illumination path to the sample holder and to direct the fluorescence emission light from the sample holder along a response path to the detection module, wherein the illumination path and the response path overlap between the beamsplitter assembly and the sample holder;

wherein:

the optical relay structure includes a plurality of beamsplitters corresponding in number to the plurality of light sources, each light source is optically coupled with a unique one of the beamsplitters, given pairs of a light source and a beamsplitter can alternately be positioned to illuminate the sample, each pair of an optically coupled light source and a beamsplitter is mounted on an excitation wheel such that given pairs can alternately be positioned to illuminate the sample by rotating the wheel, the optical relay structure further includes a plurality of emission filters corresponding in number to the number of optically coupled pairs of a light source and a beamsplitter and configured to reduce the amount of excitation light that reaches the detection module, and the emission filters are mounted on an emission wheel that can be rotated in tandem with the excitation wheel.

2. The system of claim 1, wherein the excitation wheel and emission wheel are coaxial and their rotation is driven by a common driver.

3. The system of claim 1, wherein power for the light sources is derived through wires connecting the light sources to a shaft about which the excitation wheel rotates.

4. The system of claim 1, wherein the optical relay structure further includes a condenser lens positioned in the illumination path such that excitation light exiting the condenser lens and incident on the sample holder is collimated and perpendicular to a plane of the sample holder.

5. The system of claim 1 wherein the optical relay structure further includes a field lens positioned in the response path downstream from the beamsplitter assembly and configured to collect fluorescence emission light and direct it toward the detector module.

6. The system of claim 5, wherein the field lens is positioned upstream from one of the emission filters.

7. The system of claim 1, further comprising a controller configured to manage at least one of the stage, the illumination module, the detection module, and the optical relay structure.

8. The system of claim 1, wherein the stage further includes a heating block configured to cycle the temperature of the sample such that PCR occurs, altering the fluorescence of the sample.

9. The system of claim 1, wherein the light sources are LEDs.

10. A method of reading fluorescence, comprising:

providing the fluorescence detection system of claim 1;

providing a sample holder having a plurality of sample sites, each sample site containing a fluorescent sample;

positioning a first one of the light sources and a first one of the beamsplitters so that the sample holder is illuminated with light from the first light source, and collecting a first image of fluorescence; and positioning a second one of the light sources and a second one of the beamsplitters such that the sample holder is illuminated with light from the second light source, and collecting a second image of fluorescence from the fluorescent samples.

11. A fluorescence detection system, comprising:

a stage configured to support a sample holder;

an illumination module including a plurality of discrete light sources, each light source configured to produce spectrally distinct excitation light;

a detection module configured to detect fluorescence emission light produced, in response to the excitation light from at least one of the light sources, by a fluorescent sample positioned in the sample holder; and an optical relay structure including a beamsplitter assembly configured to direct the excitation light from the illumination module along an illumination path to the sample holder and to direct the fluorescence emission light from the sample holder along a response path to the detection module, wherein the illumination path and the response path overlap between the beamsplitter assembly and the sample holder;

wherein the beamsplitter assembly includes a plurality of beamsplitters, each beamsplitter forming a pair with one of the light sources, each of the pairs of light source and beamsplitter being mounted on a rotatable wheel for alternately positioning a selected light source and beam splitter pair to illuminate a sample held by the sample holder.

12. The system of claim 11, wherein the optical relay structure further includes an emission filter positioned in the response path between the beamsplitter and the detection module and configured to reduce the amount of excitation light that reaches the detection module.

13. The system of claim 12, wherein there is a distinct emission filter for each light source, and wherein the distinct emission filters can alternately be placed in the response path depending on which light source is being used to produce excitation light.

14. The system of claim 11, wherein the optical relay structure further includes a field lens positioned in the response path downstream from a selected beamsplitter and configured to collect fluorescence emission light and direct it toward the detection module.

15. The system of claim 11, further comprising a controller configured to manage at least one of the stage, the illumination module, the detection module, and the optical relay structure.

16. The system of claim 11, wherein the stage further includes a heating block configured to cycle the temperature of the sample such that PCR occurs, altering the fluorescence of the sample.

\* \* \* \* \*